United States Patent [19]

Lewis

[11] Patent Number: 5,420,762
[45] Date of Patent: May 30, 1995

[54] AUTOMOTIVE HEADLAMP ASSEMBLY FASTENING SYSTEM

[75] Inventor: Jeffrey C. Lewis, Rochester Hills, Mich.

[73] Assignee: TRW Inc., Cleveland, Ohio

[21] Appl. No.: 126,269

[22] Filed: Sep. 24, 1993

[51] Int. Cl.[6] ............................................. B60Q 1/26
[52] U.S. Cl. .................................. 362/61; 362/80; 362/368; 24/701; 248/233.1
[58] Field of Search .................... 362/61, 80, 368, 382, 362/457; 248/223.4, 222.4, 231.3, 316.2; 403/350, 353; 24/701, 697.1, 573.2

[56] References Cited

U.S. PATENT DOCUMENTS

| | | |
|---|---|---|
| 2,117,756 | 5/1938 | Douglas . |
| 2,117,759 | 5/1938 | Douglas . |
| 2,719,750 | 10/1955 | Orr ........................................ 403/353 |
| 3,309,644 | 3/1967 | Subko ..................................... 362/80 |
| 4,012,686 | 3/1977 | Heine ................................. 248/222.4 |
| 4,550,230 | 10/1985 | Johnson . |
| 4,725,029 | 2/1988 | Herve . |
| 5,143,331 | 9/1992 | Robert . |
| 5,154,505 | 10/1992 | Sasamoto ............................. 362/368 |
| 5,163,746 | 11/1992 | Lisak ..................................... 362/80 |
| 5,201,579 | 4/1993 | Roof et al. ............................ 362/80 |

Primary Examiner—Ira S. Lazarus
Assistant Examiner—Y. Quach
Attorney, Agent, or Firm—Fay, Sharpe, Beall, Fagan, Minnich & McKee

[57] ABSTRACT

A headlamp mounting arrangement for an automotive vehicle comprises a mounting support panel which forms a part of the vehicle and a lamp assembly with mounting studs extending outwardly from the rear wall thereof through first openings in the support panel. A lock plate is connected to the mounting support panel on the side opposite the lamp assembly for sliding movement between a first position for preventing withdrawal of the mounting studs from the first openings in the mounting support plate and a second position for permitting withdrawal of the mounting studs from the first openings. A latch type engagement is provided on the lock plate for preventing undesired sliding movement of the lock plate toward the second position.

9 Claims, 4 Drawing Sheets

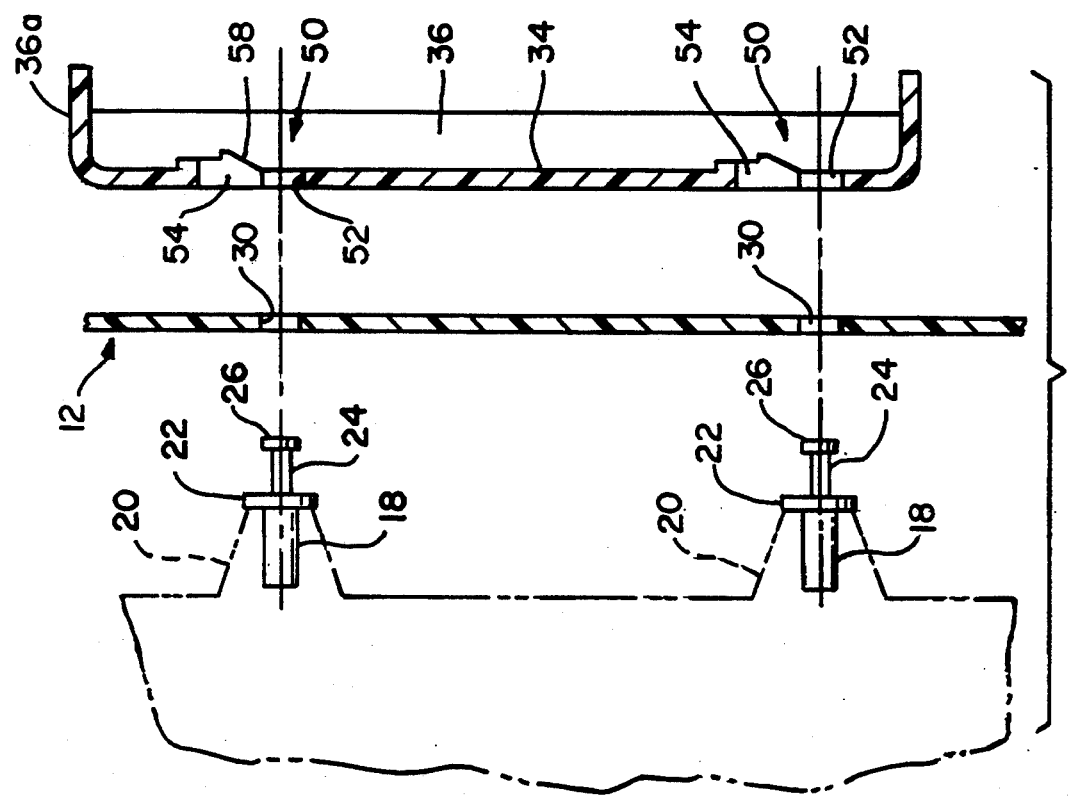
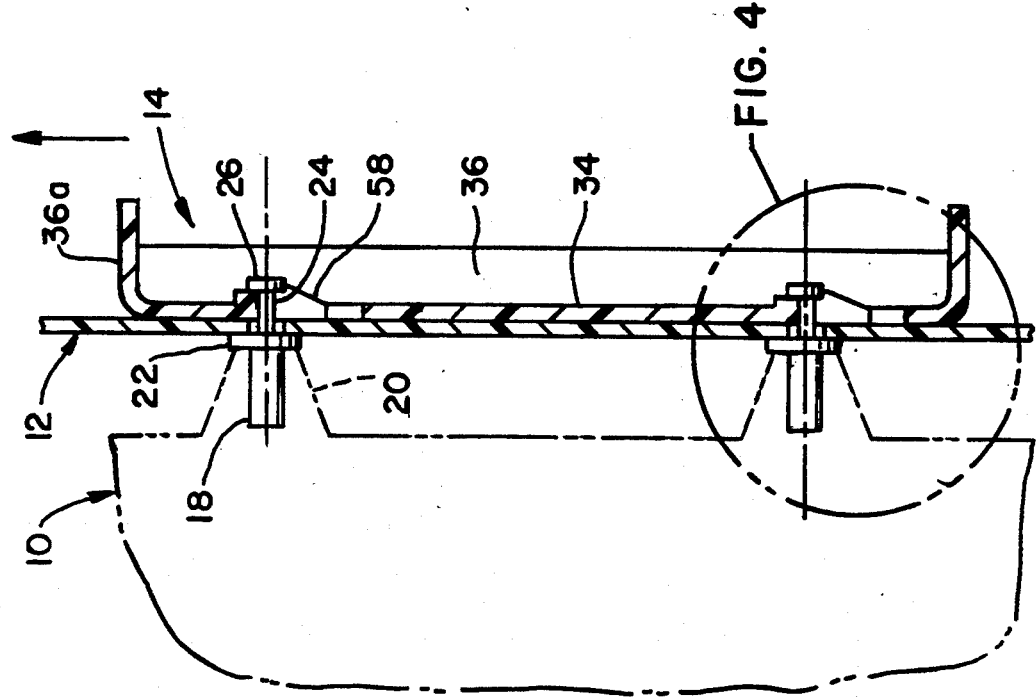

AUTOMOTIVE HEADLAMP ASSEMBLY FASTENING SYSTEM

BACKGROUND OF THE INVENTION

The subject invention is directed toward the art of automotive vehicle headlamps and, more particularly, to a headlamp mounting arrangement that greatly simplifies installation and removal of automotive headlamp assemblies.

Vehicle headlamps are typically mounted by means of bolts and nuts or similar threaded fasteners. Consequently, installation and removal of headlamp assemblies has generally required the use of tools and has been time consuming and relatively difficult.

Although various types of clip fasteners have been used in addition to the more standard threaded fasteners, the clips have often been difficult to use or have been unsatisfactory for a variety of reasons. Accordingly, a need exists for an improved system for mounting vehicle headlamp assemblies.

SUMMARY OF THE INVENTION

The subject invention provides an improved system which allows the headlamp assembly to be mounted and removed without the use of tools while providing a rigid and secure fastening of the headlamp assembly to the vehicle body panels. In accordance with the subject invention, a lamp mounting arrangement is provided for a vehicle and includes a mounting support panel forming a part of the vehicle. A lamp assembly having a rear exterior wall with a plurality of mounting studs extending therefrom is arranged to be releasably joined to the support panel. The mounting studs each have an outer end portion with an enlarged head that extends through aligned first openings in the support panel. A lock plate is connected to the mounting support panel on the side of the mounting support panel opposite the lamp assembly for sliding movement between a first position for preventing withdrawal of the mounting studs from the first openings in the mounting support panel, and a second position for permitting withdrawal of the mounting studs from the first openings. Latch means are formed on the lock plate for limiting undesired sliding movement of the lock plate in a direction toward the second position.

Preferably, and in accordance with a more limited aspect of the invention, the lock plate includes slotted portions which engage between the enlarged heads and the mounting support panel. Additionally, the latch means are associated with the slotted portions and are arranged to engage the enlarged head on at least one mounting stud.

In accordance with yet another aspect of the invention, the latch means include a resilient shoulder adjacent the slotted portions with the resilient shoulder positioned and arranged to engage the enlarged head of the studs and prevent movement of the lock plate until the resilient shoulder is manually deflected or a predetermined force is applied. Preferably, the lock plate is connected to the mounting support panel by resilient post elements which extend from the lock plate through second openings formed in the mounting support panel. In the preferred form, the second openings are elongated slots sized to permit sliding movement of the lock plate between the first and second positions.

In accordance with a more limited aspect, the lock plate is a unitary plate member molded from plastics material.

As can be seen from the foregoing, installation of the lamp assembly merely requires that the stud portions be extended through the openings in the mounting support panel which can be a portion of the vehicle body panels. Thereafter, the lock plate is positioned on the opposite side over the studs and slid laterally to the lock position. To remove the headlamp assembly, it is merely necessary to deflect the latch means on the lock plate and slide the latch plate to the first or release position. Normally, however, the lock plate is firmly latched in position and the resilient nature of the lock means maintains a firm bias on the headlamp assembly to maintain it locked firmly in position and to prevent undesired release movement of the lock plate.

Accordingly, a primary object of the invention is the provision of a simple yet rigid headlamp mounting assembly which can be manually installed and released without the use of tools or special equipment.

Yet another object of the invention is the provision of an assembly of the type described which allows a single molded plastic lock plate assembly to cooperate with a body panel to provide firm mounting of the headlamp assembly.

A still further object is the provision of a fastening assembly of the type described which is simple and inexpensive but highly reliable in functioning.

BRIEF DESCRIPTION OF THE DRAWINGS

The above and other objects and advantages of the invention will become apparent from the following description when read in conjunction with the accompanying drawings wherein:

FIGS. 3 and 3A are cross-sectional views taken on lines 3—3 of FIG. 1 and respectively showing the components in assembled and disassembled relationship;

DETAILED DESCRIPTION OF THE PREFERRED EMBODIMENT

Figure 1:
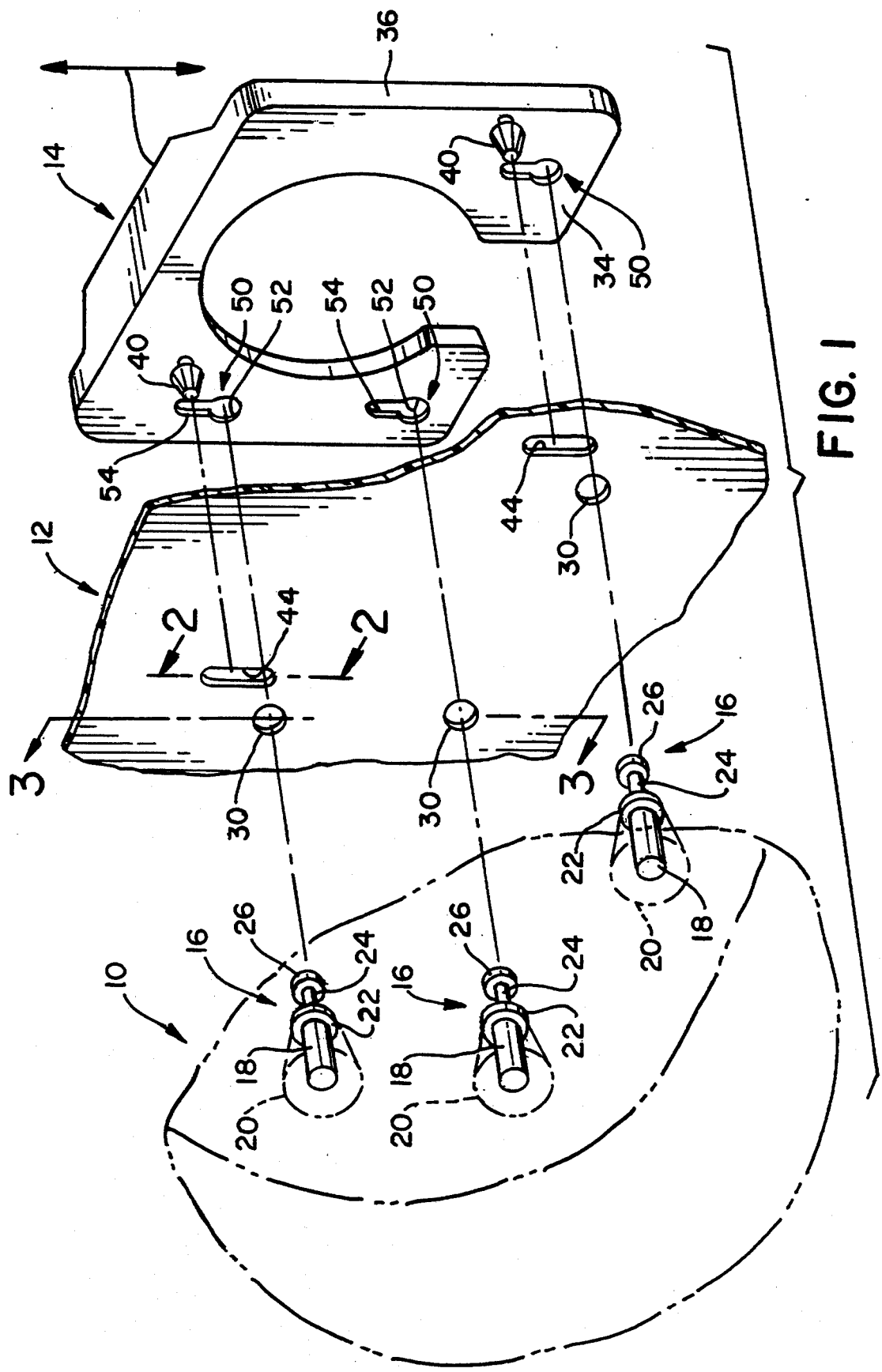
FIG. 1 shows in an exploded pictorial view of the overall arrangement of the headlamp assembly mounting system of the subject invention (the headlamp assembly is shown in phantom)

Referring more particularly to the drawings wherein the showings are for the purpose of illustrating a preferred embodiment of the invention, and not for the purpose of limiting same, FIG. 1 best illustrates the overall arrangement of the subject invention. As noted earlier, the FIG. 1 showing is a pictorial illustration of the major components of the system in an exploded, disassembled relationship. As illustrated in FIG. 1, the overall system comprises the headlamp assembly 10 arranged to be joined to a body panel 12 by a lock plate 14. The headlamp assembly 10 is shown only generally and in phantom. It could obviously have a variety of shapes and configurations in keeping with the many shapes, sizes, and configurations of conventional headlamp assemblies. However, in the subject embodiment, the assembly 10 is provided with pins or studs 16 which extend rearwardly from the rear wall of assembly 10. The pins 16 are preferably formed from a suitable metal such as steel and include a shank 18 which is adapted to be permanently molded or otherwise connected directly into the housing of the lamp assembly 10. In the subject embodiment, the shank 18 is molded into a raised or rearwardly extending foot portion 20 of the lamp assembly housing.

Preferably, the pins 16 include a shoulder which is in the nature of a radially extending flange 22 that acts as a base or limit for the pin and engages with the outer top end of foot portion 20. Extending axially outwardly from the flange 22 is an exterior shank 24 that terminates in a radially extending, enlarged head 26.

The headlamp assembly 10 is illustrated as being provided with three of the pins or studs 16, however, the actual number and placement of these studs could vary from that shown.

Headlamp assembly is mounted to the vehicle body panel 12 by having the studs 16 extend through openings 30 formed through body panel 12. The openings 30 are preferably simple round openings sized slightly larger than the enlarged heads 26 to permit easy insertion of the heads. Although the body panel 12 is shown as a simple sheet metal panel, it could be of other constructions and provided with suitable reinforcing and the like (not shown).

Figure 2:
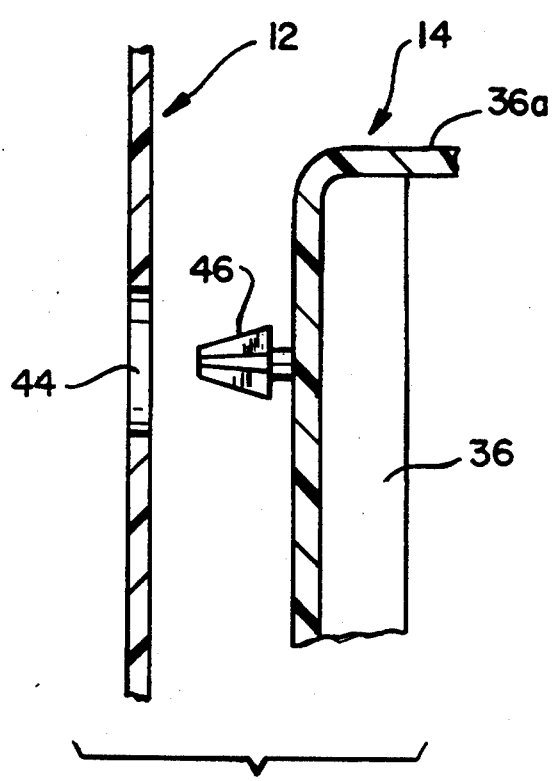
FIGS. 2 and 2A are cross-sectional views taken on lines 2—2 of FIG. 1 and respectively showing the lock plate in a position prior to installation on the auto body panel and after installation but in an elevated lamp removal position.

The lamp assembly is maintained in its mounted position on the auto body panel by the previously-mentioned lock plate 14. The lock plate 14 is best seen in FIGS. 1, 2, and 3 and generally comprises a molded plastic, U-shaped plate body 34 having the general configuration shown and provided with a continuous peripheral reinforcing flange 36 that extends completely about the exterior and interior of the U-shaped plate 34. As shown in FIGS. 3 and 3A, the top portion of the flange 36 extends rearwardly a slightly greater distance than the remaining portion to provide a handle or manually gripping portion 36a.

Figure 2A:
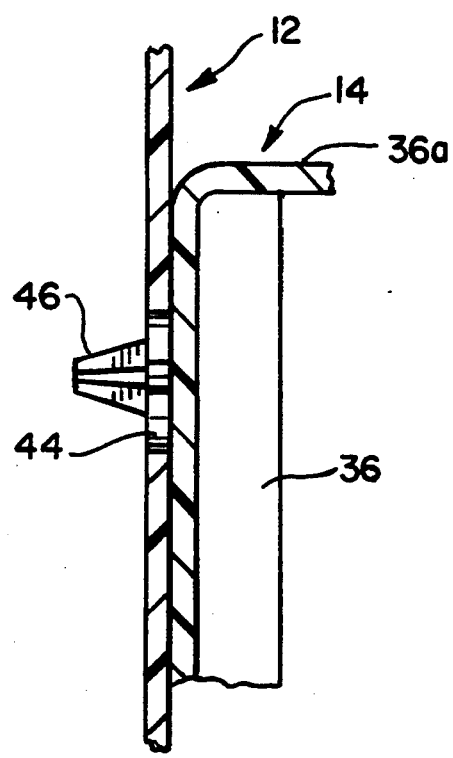

The lock plate 14 is connected to the auto body panel 12 in a manner which maintains it in its operable position but allows it to move vertically between a first release position and a lowered second position which locks the lamp assembly to the body panel 12. For this reason, the lock plate is provided with connecting mean in the form of a plurality of outwardly extending pins 40 that perform a locating and mounting function. Two of the pins 40 are shown in FIG. 1. The pins are positioned to engage the elongated, vertically extending openings 44 formed in the body panel at locations corresponding to the locations of the pins 40 on plate 14. The pins 40 could be of many types. The preferred form is best illustrated in FIGS. 2 and 2A and includes an arrow-shaped head with four radially resilient sections that can compress or collapse radially inwardly to permit insertion into the narrower openings 44. After insertion, the arrow like head 46 expands to hold the plate 14 firmly in position in the body panel 12. The plate is, however, capable of being moved manually vertically relative to the slots 44.

As best seen in FIGS. 1, 3, and 3A, the plate 14 is further provided with three keyhole-shaped openings 50 which are located on plate 14 at locations corresponding to the locations of the first body panel openings 30. Each of the key-hole shaped openings 50 includes a circular opening 52 and an elongated, upwardly extending slot Openings 52 are preferably at least as large as openings and the stud heads 26. Thus, when the lock plate is in its elevated position relative to slots 44, the openings 52, 30 are in alignment and the stud head 26 can be inserted therethrough. Thereafter, the lock plate 14 can be slid downwardly to the latched position shown in FIG. 3. This causes the plate to engage behind the stud head 26 and firmly pull the lamp assembly into a mounted position where it is held by the presence of the lock plate.

Figure 4:
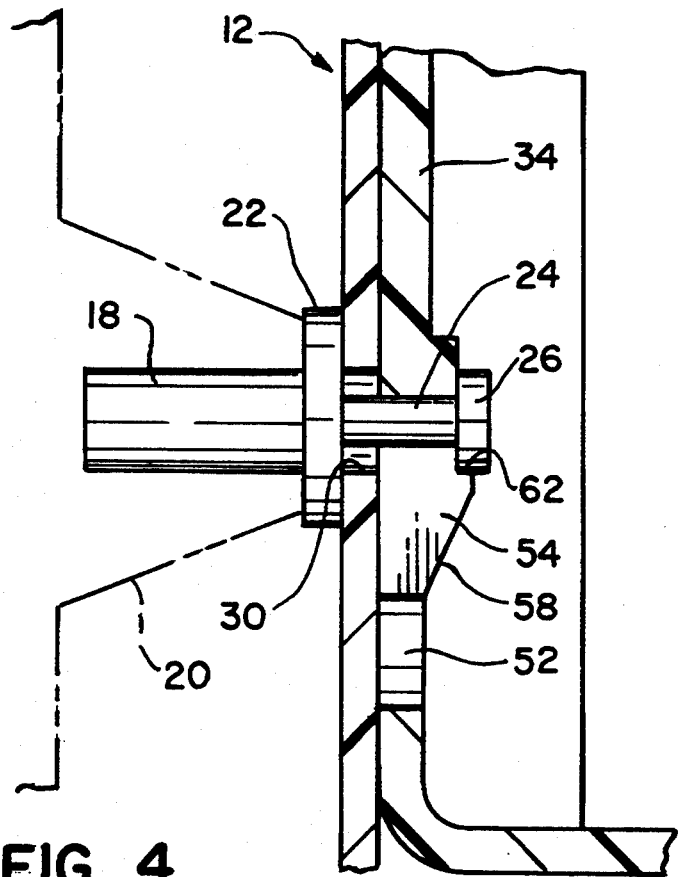
FIG. 4 is a greatly enlarged view of the circled portion of FIG. 3 and showing the latch means on the lock plate.
Figure 4A:
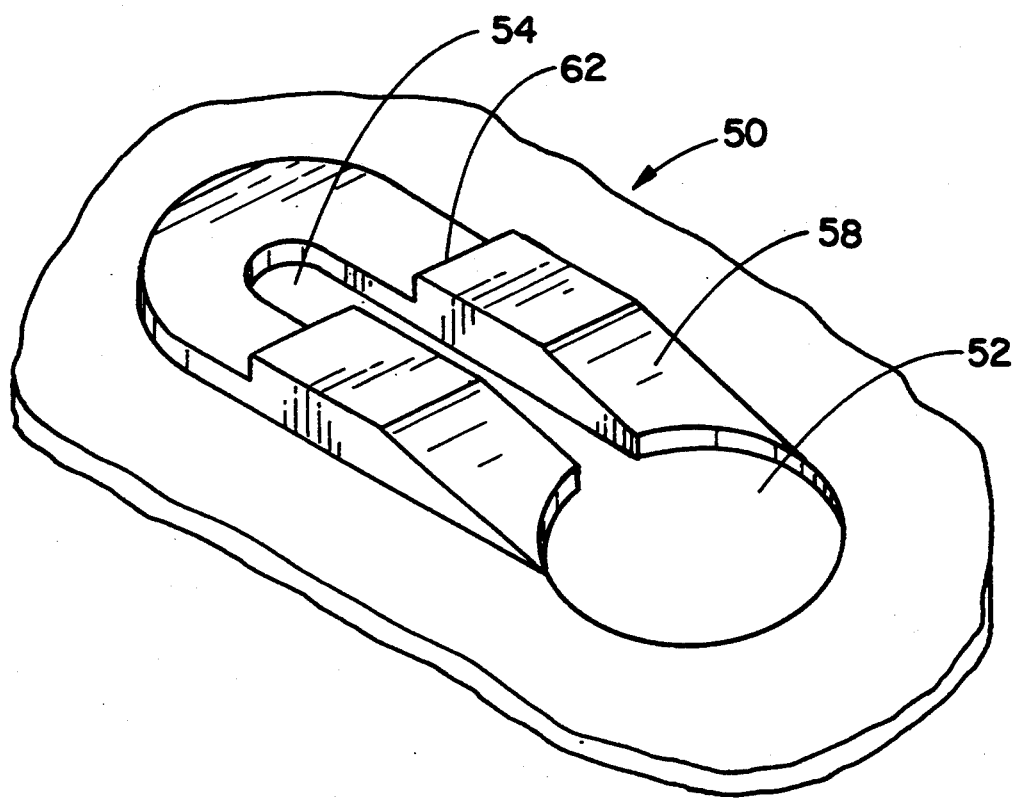
FIG. 4A is an isometric view showing the latch means on the lock plate.

As best shown in FIGS. 4 and 4A, together with FIG. 3, the lock plate 14 is provided with latch means to maintain it in the down locked position and to firmly bias the lamp assembly into engagement with the body panel 12. As shown in FIGS. 3 and 4, the latch means comprise a ramp section 58 which is located adjacent both sides of the slot section 54 of openings 50. This upward ramp section 58 leads to a raised flat section which includes a shoulder 62. The shoulder is positioned and arranged to engage 14 about the head 26 as shown in FIG. 4 to lock the plate 4 in its lower second lock position. Only by manually deflecting the shoulder portion axially inwardly relative to head 26 of pin 16 or by exerting a predetermined upward force on the lock plate is it possible to release the lock plate from the latched position. This, however, can be accomplished without the use of tools or any additional apparatus.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a vehicle having a lamp mounted therein, a lamp mounting arrangement comprising:
   a mounting support panel forming a part of the vehicle, a plurality of first openings in the support panel, a lamp assembly having a rear exterior wall with a plurality of mounting studs extending outwardly therefrom, each stud having an outer end portion with an enlarged head extending through aligned ones of the first openings in the support panel;
   a lock plate means located between the enlarged heads and the mounting support panel and connected to the mounting support panel on a side of the mounting support panel opposite the lamp assembly by connecting means for permitting sliding movement of the lock plate means between a first position engaged with the enlarged heads for preventing withdrawal of the mounting studs from the first openings in the mounting support panel and a second position for permitting withdrawal of the mounting studs from the first openings; and,
   latch means associated with the lock plate means for limiting undesired sliding movement of the lock plate means in a direction toward the second position.

2. The lamp mounting arrangement as defined in claim 1 wherein the lock plate means includes slotted portions which engage between the enlarged heads and the mounting support panel.

3. The lamp mounting arrangement as defined in claim 2 wherein the latch means is associated with each of the slotted portions and engages an enlarged head on at least one mounting stud.

4. The lamp mounting arrangement as defined in claim 3 wherein the latch means comprises a resilient shoulder adjacent each the slotted portion.

5. The lamp mounting arrangement as defined in claim 1 wherein the connecting means comprises post elements which extend from the lock plate means through second openings formed in the mounting support panel.

6. The lamp mounting arrangement as defined in claim 5 wherein the lock plate means is formed of plastics material and the post elements are formed integrally therewith.

7. The lamp mounting arrangement as defined in claim 5 wherein the second openings are elongated slots sized to permit sliding movement of the post elements of the lock plate between the first and second positions.

8. The lamp mounting arrangement as defined in claim 5 wherein the post elements include resilient head portions that can be collapsed to permit selective insertion and removal of the post elements from the second openings.

9. The lamp mounting arrangement as defined in claim 5 wherein the post elements include shanks that extend through the second openings and are retained therein by resilient head portions that are formed on the shanks, the second openings being sized to permit free sliding movement of the shanks therein.

* * * * *